US008183498B2

(12) United States Patent
Turk et al.

(10) Patent No.: US 8,183,498 B2
(45) Date of Patent: May 22, 2012

(54) SYSTEMS AND METHOD FOR OPTIMIZATION OF LASER BEAM SPATIAL INTENSITY PROFILE

(75) Inventors: Brandon A. Turk, Saratoga, CA (US); David S. Knowles, San Diego, CA (US)

(73) Assignee: TCZ, LLC, San Diego, CA (US)

( * ) Notice: Subject to any disclaimer, the term of this patent is extended or adjusted under 35 U.S.C. 154(b) by 1391 days.

(21) Appl. No.: 11/673,980

(22) Filed: Feb. 12, 2007

(65) Prior Publication Data
US 2007/0251926 A1    Nov. 1, 2007

Related U.S. Application Data

(63) Continuation-in-part of application No. 11/381,052, filed on May 1, 2006.

(51) Int. Cl.
*B23K 26/00* (2006.01)

(52) U.S. Cl. .......... 219/121.65; 219/121.66; 219/121.62

(58) Field of Classification Search ............. 219/121.65, 219/121.66, 121.73, 121.78, 121.82, 121.61, 219/121.62
See application file for complete search history.

(56) References Cited

U.S. PATENT DOCUMENTS

| 6,341,042 | B1 * | 1/2002 | Matsunaka et al. | ........... 359/618 |
| 6,558,991 | B2 * | 5/2003 | Yamazaki et al. | ........... 438/151 |
| 6,596,613 | B1 | 7/2003 | Kusumoto et al. | |
| 6,680,460 | B1 * | 1/2004 | Takaoka et al. | ........... 219/121.73 |
| 6,870,126 | B2 * | 3/2005 | Jyumonji et al. | ........ 219/121.65 |
| 7,317,179 | B2 * | 1/2008 | Akins et al. | ................. 250/201.1 |
| 7,884,303 | B2 * | 2/2011 | Partlo et al. | .............. 219/121.65 |
| 2003/0022471 | A1 | 1/2003 | Taketomi et al. | |
| 2004/0171237 | A1 | 9/2004 | Tanaka et al. | |
| 2005/0035103 | A1 | 2/2005 | Partlo et al. | |
| 2005/0259709 | A1 | 11/2005 | Das et al. | |

FOREIGN PATENT DOCUMENTS

| GB | 2177256 A | 1/1987 |
| WO | 2006107926 A2 | 10/2006 |
| WO | WO2006107926 | * 10/2006 |

OTHER PUBLICATIONS

International Search Report for PCT/US2008/052494 mailed Jul. 8, 2008.

* cited by examiner

*Primary Examiner* — M. Alexandra Elve

(74) *Attorney, Agent, or Firm* — Procopio Cory Hargreaves & Savitch LLP; Noel C. Gillespie

(57) ABSTRACT

A thin beam directional crystallization system configured to process a substrate comprises a laser configured to produce laser light, the laser configured to have a high energy mode and a low energy mode. The high energy mode is configured to produce light energy sufficient to completely melt a substrate coated with amorphous silicon film, while the low energy mode is configured to produce light energy that is not sufficient to completely melt a substrate coated with amorphous silicon film. The system further comprises beam shaping optics coupled to the laser and configured to convert the laser light emitted from the laser into a long thin beam with a short axis and a long axis, a stage configured to support the substrate and film, and a translator coupled with the stage, the translator configured to advance the substrate and film so as to produce a step size in conjunction with the firing of the laser.

12 Claims, 6 Drawing Sheets

SYSTEMS AND METHOD FOR OPTIMIZATION OF LASER BEAM SPATIAL INTENSITY PROFILE

RELATED APPLICATIONS INFORMATION

This application claims priority as a continuation in part under 35 U.S.C. 120 to U.S. patent application Ser. No. 11/381,052, entitled "Systems and Methods for Optimization of Laser Beam Spatial Intensity," filed May 1, 2006, which is incorporated herein in its entirety as if set forth in full.

BACKGROUND

1. Field of the Invention

The field of the invention relates generally to, Liquid Crystal Displays (LCDs), and more particularly to systems and methods for manufacturing LCDs.

2. Background of the Invention

There is already a well-established and growing market for active matrix LCDs, in which an active thin film transistor (TFT) is used to control each pixel in the display. For example, active matrix LCDs are the prevailing technology for computer screens. Additionally, in recent years, active matrix LCD solutions also have made dramatic inroads in market segments such as televisions, mobile phones, PDAs, video recorders, etc.

Active matrix LCDs are predicted to be the fastest growing segment of the display industry, with a projected average annual growth rate of 35 percent over the next five years. In contrast, passive LCDs and conventional cathode ray tubes (CRTs), are predicted to have flat to negative growth rates. The only other display technology predicted to have positive growth is Organic Light Emitting Diode (OLED) displays, which is just now emerging for specialized applications and is predicted to more than double each year beyond 2007.

In addition to rapid overall growth, the nature of the LCD market is changing, i.e., newer LCD applications include a more diversity and more special requirements. For example, phones represent approximately 50 percent of all LCDs but only 2 percent of total LCD area. In contrast, monitors represent approximately 27 percent of LCDs but 50 percent of the total area. With rapid growth of TV applications and large screen sizes, televisions are projected to comprise more than 30 percent of the total LCD area by 2008. These large screen applications have many special requirements compared to previous LCD applications.

To support the expected high growth rates and to successfully compete for new market opportunities, LCD manufacturers must be able to leverage emerging display fabrication techniques to improve the features and performance of the LCD offerings, while simultaneously improving their production costs and throughput.

As the LCD industry moves into the next phase of rapid growth and product diversity, some factors for success can include smaller pixel size, higher densities, which are a direct function of the size of the TFTs, and higher TFT switching speeds to support video requirements. Brighter display capabilities, improved aperture ratios for more light per pixel, and overall lower production costs are also factors for success. Lower production costs can result from both faster processing throughput and a consistently higher yield of good displays per panel. For long term success, it will be important for LCD manufacturers to invest in technology solutions that can also be cost-effectively adapted for efficient fabrication of emerging high-growth screen types such as OLED.

The two primary process methods that are currently used for creating a conductive layer on a glass substrate that will support the fabrication of TFTs for active matrix LCDs are Amorphous silicon (a-Si) and Low temperature polycrystalline silicon (poly-Si or LTPS). In the a-Si process, a gate layer is created directly on PECVD Si film. In the poly-Si or LTPS process, the PECVD Si film is crystallized prior to gate fabrication to produce higher performance TFTs. In these processes the temperature is kept low to avoid melting the glass substrate. Because the movement of electrons is inherently slower through amorphous silicon transistors, a-Si based TFTs have to be physically larger in order to provide sufficient current flow from source to drain. On the other hand, due to the significantly higher electron mobility that can be achieved with poly-silicon, LTPS based TFTs can be smaller and faster. Because poly-silicon transistors are inherently smaller, more light can pass through each pixel. This allows design flexibility to allow for improved aperture ratios, greater pixel densities, or both.

Despite the TFT size and performance advantages of LTPS, most LCD panels today are still fabricated using an amorphous-silicon process. This is due primarily to the relatively lower costs of a-Si that result from fewer process steps and the potential unknowns associated with less mature LTPS equipment. A-Si also has been a "safe" process for minimizing costs, since a single defect in a large screen LCD means scrapping the whole device; however, even though a-Si processes are fairly well established and controllable, it has now become clear that a-Si technology is approaching its limitations with regard to supporting the emerging demand for higher pixel densities, faster response, and brighter displays.

To date, LTPS has typically been targeted at fabricating smaller, higher performance displays because the smaller physical size of poly-silicon based TFTs allow for increased screen brightness, higher pixel density, and lower energy consumption. Also, the inherently faster switching of LTPS transistors supports the requirements of video applications such as video recorders as well as video features in cell phones and PDAs.

Display manufacturers also need to plan ahead for the emergence of Organic Light Emitting Diode technology, which will become a significant segment of the display market with rapid growth projected to begin in 2007. Some simple OLED devices are already being deployed for specialized applications, such as small-screen, high brightness displays for automotive instruments and digital cameras. Several companies have announced their intention to produce large-screen OLED displays that, when productized, will gain significant market share for applications where display brightness and color is a key differentiating factor.

In OLED-based displays, the molecular structure actually emits light rather than acting as a light valve for a backlit light source, thus enabling much brighter screens. Because the light-emitting material in OLED is current-driven, rather than voltage-driven as in LCDs, the higher electron mobility and more stable current capacity of poly-silicon will be a key enabler for OLED implementation. The inherent higher luminescence of OLED also will allow designers to opt for smaller pixels to produce the same brightness, thereby enabling higher resolutions. Implementation of OLED displays will therefore be much more compatible with the smaller geometries achievable through poly-silicon.

Moving forward, display manufacturers need to deploy panel fabrication technologies that can provide high-throughput, high-yield capacity for poly-silicon production to meet today's diverse, rapidly growing LCD requirements while also laying the foundation for future, e.g., OLED market ramp-up. LCD or OLED fabrication methodology can focus on three areas: producing high-performance TFTs, yielding uniform material and devices across the entire panel, and optimizing production efficiency through a combination of high throughput and low operational costs.

The most widely used LTPS fabrication techniques involve a surface treatment that uses a laser to melt a silicon film, heating it to a liquid point over a very short time period, generally measured in nanoseconds, after which the Si film recrystallizes into polycrystalline silicon. The primary challenges in LTPS technologies involve the effective control of the process to assure uniform crystallization across the entire panel while providing a high level of sustained process throughput and low operational costs.

SUMMARY

A thin beam crystallization system configured to process a substrate comprises a laser configured to produce laser light, the laser configured to have a high energy mode and a low energy mode. The high energy mode is configured to produce light energy sufficient to completely melt a silicon substrate, while the low energy mode is configured to produce light energy that is not sufficient to completely melt a silicon substrate. The system further comprises beam shaping optics coupled to the laser and configured to convert the laser light emitted from the laser into a long thin beam with a short axis and a long axis, a stage configured to support the silicon substrate, and a translator coupled with the stage, the translator configured to advance the silicon substrate so as to produce a step size in conjunction with the firing of the laser.

In one aspect, the system can be configured to perform one type of annealing process, such as ELA, in the low energy mode, while performing another type of annealing process, such as Thin-beam Directional Crystallization, when in the high energy mode. In this manner, the process selecting can be optimized for particular areas to be formed on the substrate.

These and other features, aspects, and embodiments of the invention are described below in the section entitled "Detailed Description."

BRIEF DESCRIPTION OF THE FIGURES

Features, aspects, and embodiments of the inventions are described in conjunction with the attached drawings, in which.

DETAILED DESCRIPTION

Figure 1:
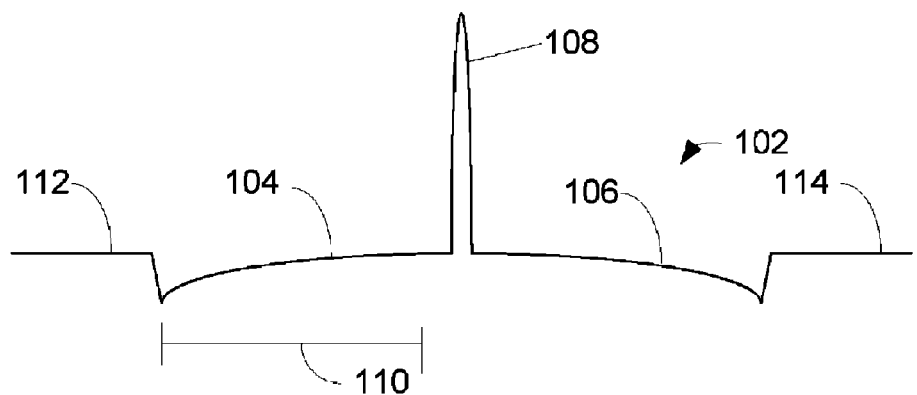
FIG. 1 is a diagram illustrating an example cross section of a film surface after a single pulse irradiation.

Thin-beam Directional Crystallization, or Thin-beam Directional 'Xtallization (TDX), fabrication methods can combine poly-silicon's inherent advantages with efficient volume-oriented production capabilities. The end result can be superior electron mobility, flat surface topology, a large process window, and greater throughput. Different types of lasers can be used in thin-beam directional crystallization, for example, in one embodiment a solid state laser can be used. In another embodiment a high energy Excimer laser can be used in the TDX process. A master oscillator power amplifier (MOPA) configuration that was originally developed for semiconductor of microlithography applications can also be used. The laser can operate at 351 nanometers and provide over 900 watts of power with exceptional pulse-to-pulse stability and high reliability. Other wavelengths can also be used, for example, 308 nanometers. Generally, any wavelength that is strongly absorbed by the material to be melted, e.g., silicon, can be used. A TDX system is described in co-pending U.S. patent application Ser. No. 10/781,251 entitled "Very High Energy, High Stability Gas Discharge Laser Surface Treatment System," filed Feb. 18, 2004; U.S. patent application Ser. No. 10/884,101 entitled "Laser Thin Film Poly-Silicon Annealing Optical System," filed Jul. 1, 2004; U.S. patent application Ser. No. 10/884,547 entitled "Laser Thin Film Poly-Silicon Annealing System," filed Jul. 1, 2004; and U.S. patent application Ser. No. 11/201,877 entitled "Laser Thin Film Poly-Silicon Annealing Optical System," filed Aug. 11, 2005, which are incorporated herein by reference as if set forth in full.

The TDX optical system used in conjunction with the systems and methods described herein can convert laser light into a very long thin uniform beam and deliver it onto the silicon substrate. In addition, it can be configured to stabilize the beam's energy, density and pointing; all of which can improve the consistency of the TDX process. In one embodiment, each pulse can expose an area of approximately 5 microns wide and 730 millimeters long. The length of the beam can be matched to the substrate width so that the glass is processed in a single pass. This can help to ensure a high degree of uniformity and rapid throughput. During exposure, the panel can be scanned at a constant velocity and the laser can be triggered to fire at a pitch, or step size of, e.g., 2 microns. The pitch can be chosen so that the melt region always seeds from the high quality crystals of the previous pulse, producing long directional poly-silicon crystals. Each pulse also melts the large ridge or protrusion at the center of the previous melt region, resulting in a more planer surface.

The TDX process is based on a form of controlled super lateral growth where the melt region re-solidifies laterally from the edges and towards the center. In contrast to ELA where crystal growth proceeds vertically from within the silicon layer, lateral growth produces large directional poly-silicon grains with high electron mobility. The TDX process has a much larger process window than ELA because it relies on spatially controlled complete melting of the silicon film and avoids energy sensitive partial film melting.

The use of a System on Glass (SOG) design approach is another evolving arena that is only made possible with poly-silicon, and which will also benefit from the new TDX advances in LTPS process efficiency. The higher electron mobility and smaller size transistors that are achievable with LTPS allow the drive electronics to be fabricated directly into the thin Si coating. This provides a powerful method to reducing panel cost and also improves panel robustness by decreasing the need for tab bond connections. Poly-silicon's much higher electron mobility allows for additional integration of drive electronics such as integrating digital-to-analog converter (DAC) on the substrate and reducing the number of drivers, e.g., by using faster drivers to control more TFT switches.

The overall cost savings with SOG can be very dramatic, especially for processing large panels that consist of many small LCD screens. Using a conventional a-Si approach with separate tab bonded drive electronics for each screen, the drive chips can comprise a significant percentage of the cost per screen as well as an expensive additional assembly step. In comparison, SOG with poly-silicon allows the drive electronics to be efficiently fabricated during the backplane manufacturing process.

With this in mind, FIG. 1 is a diagram illustrating an example cross section of a film surface 102 after a single pulse irradiation in a thin-beam directional crystallization process in accordance with one embodiment of the systems and methods described herein. Film surface 102 can, for example, be amorphous silicon. The thin-beam irradiation melts a portion of surface 102 using a laser. The melted portion generally freezes or solidifies from the sides inward to the middle of the melted region, leaving two laterally solidified regions 104 and 106. This is because each un-melted edge of silicon film 102 acts as a "seed" on which the melted silicon can grow.

Protrusions 108 can exist at the last point of freezing generally at or near the center of the irradiated surface. Protrusion 108 can be caused when the two edges grow into each other. At or near the center where the two edges grow together the crystallized structures generally will not match because each edge is "seeded" from opposite sides of the melted region and these sides do not generally match each other. Where the mismatched structures meet the crystals will push into each other and push up from the surface. These protrusions 108 can be on the order of a film thickness. The film thickness is commonly about 50-100 nm, however, other film thicknesses are possible.

Protrusion 108 breaks up the uniformed crystallized structure of the surface. Further, as discussed above, the pattern of protrusions 108 that appear after annealing can also make it difficult to deposit a uniform gate dielectric layer, leading to non-uniformity in the TFT performance across the panel. In order to remove protrusion 108 it can be re-melted in the next laser shot.

For example, film surface 102 can be moved a certain step size under the laser for the next shot. The step size must be set, however, to ensure that sufficient laser energy is imported to protrusion 108 so as to ensure protrusion 108 melts. Accordingly, the need to re-melt each protrusion 108, limits the maximum step size that can be achieved. The maximum theoretical step size is equal to lateral growth distance 110, because the laser must re-melt protrusion 108. In the example of FIG. 1 the lateral growth distance is equal to about one half the width of the melt region. Therefore, the theoretical maximum step size that can be used and still ensure that protrusion 108 is melted is equal to approximately the lateral growth distance minus the width of protrusion 108.

Generally, however, the step size must be kept much less than the theoretical maximum, e.g., by several hundred nanometers where the laser pulse width is about 5 μm. This reduction reduces throughput. The actual step size will be less than the maximum theoretical step size because greater energy is required to re-melt the protrusions 108. This is because protrusion 108 is thicker than the rest of film surface 102. Additionally, protrusions 108 can scatter the laser light. So, not only will it take more energy to re-melt protrusion 108 due to its thickness, more energy will also be needed to make up for laser energy scattered by protrusion 108.

Figure 4:
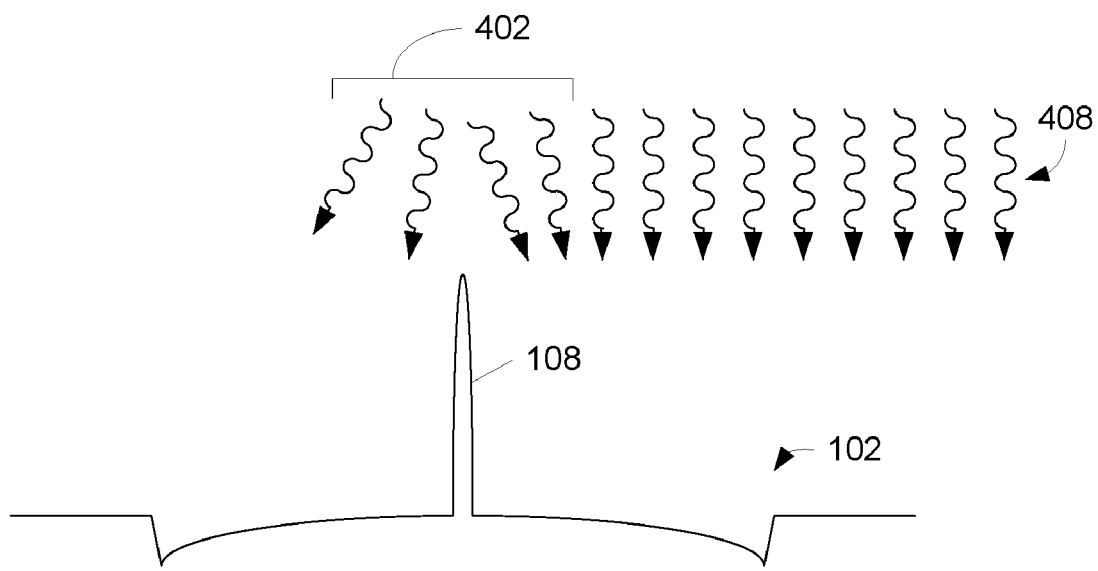
FIG. 4 is a diagram illustrating an example scattering of incident photons during the second irradiation illustrated in FIG. 3.

FIG. 4 is a diagram illustrating an example scattering of incident photons during irradiation. As incident photons 408 irradiate surface 102 some of those photons 402 are scattered by protrusion 108. Thus, more energy can be required to melt protrusion 108. As discussed above, this scattering and the extra thickness of protrusion 108 can lower the achievable step distance and increase processing time of LCDs, because more energy is required to melt protrusion 108. Accordingly, a spatial intensity, short-axis profile that directs more energy at the location of protrusion 108 can be used to maximize step size 304.

Figure 2:
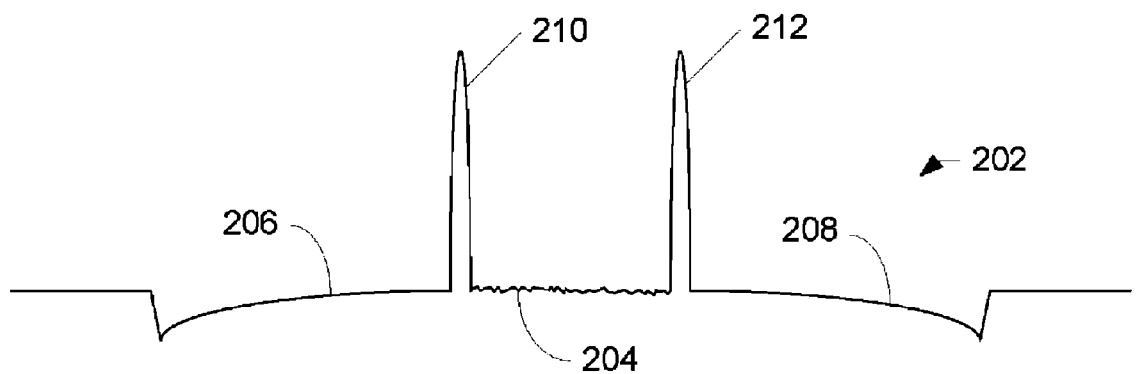
FIG. 2 is a diagram illustrating another example cross section of a film surface after a single pulse irradiation.

It should also be noted that the laser beam width must be controlled to avoid the formation of nucleated grains 204 as illustrated in FIG. 2. Nucleated grains can occur when the center cools before the sides can grow together. When the center cools before the sides can grow together, its structure will generally not match the crystalline structure of either side, since it does not "seed" off of either side. Rather if the center cools faster than the sides can grow together it will seed vertically from within. This can occur if the melted region is too wide, i.e., the laser beam width is too wide. When the melted region is too wide the sides cannot grow together before the center solidifies.

If the beam is too wide, then as lateral solidified regions 206 and 208 grow to the center nucleated region 204 and two protrusions 210 and 212 can occur. Protrusions 210 and 212 can be caused when the edges grow into nucleated region 204. The crystallized structures of each lateral solidified region 206 and 208 generally will not match nucleated region 204 because each edge is "seeded" from opposite sides of the melted region. Where the mismatched structures meet the crystals will push into each other and push up from the surface. As discussed above, it is generally preferable that the crystallized structure of an LCD formed when the film surface 202 solidifies be uniform. Protrusions 210 and 212 break up the uniform crystallized structure of the surface. Therefore, it can be advantageous to limit the beam width such that nucleated region 204 does not occur. For example, in one embodiment, the beam width is approximately 5 μm; however, it will be understood that the beam width will depend on a particular embodiment. As long as each side can grow together before nucleation occurs, the fine-grain nucleated region 204 will not occur.

As discussed above, film surface 102 can be moved, or stepped underneath the beam to melt protrusion 108. Surface 102 can, for example be moved to the left a little less than one half the pulse width. Protrusion 108 can then be re-melted, along with a small portion of lateral solidified region 104, all of lateral solidified region 106 and a portion of un-irradiated amorphous-Si 114. As a lateral solidified region grows from the left to the right it will seed from lateral solidified region 104, continuing the crystalline structure of lateral solidified region 104 until meeting in the middle to form a new protrusion. This can be seen with respect to FIG. 3.

Figure 3:
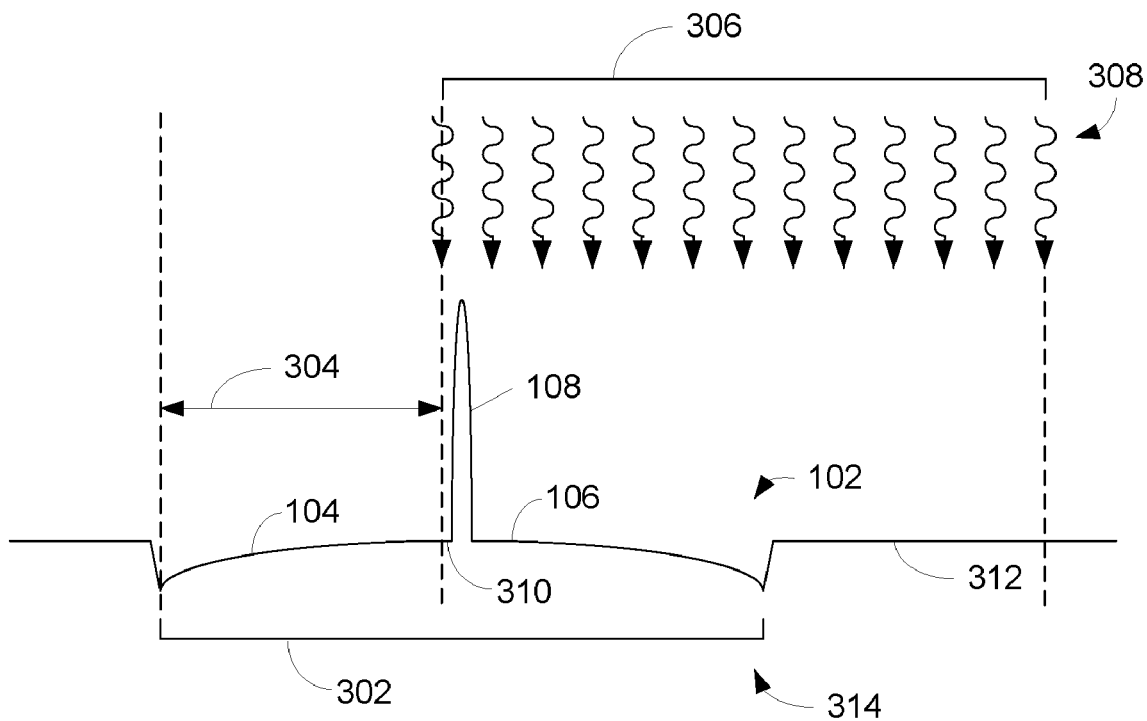
FIG. 3 is a diagram illustrating an example position of a beam during a second irradiation of the cross section of a film surface of FIG. 1.

FIG. 3 is a diagram illustrating an example position of a beam during a second irradiation of the cross section of a film surface of FIG. 1. The position of the beam during the first irradiation is shown at position 302. As discussed above, film surface 102 can be moved underneath the beam to melt the next section of surface 102. Surface 102 can, for example, be moved to the left a step distance 304 which can be a little less than one half the beam width. The beam will then be positioned at 306 during the second shot, which will irradiate surface 102 with incident photons 308. Photons 308 can re-melt protrusion 108 along with a small portion 310 of lateral solidified region 104, all of lateral solidified region 106 and a portion 312 of un-irradiated amorphous-Si 114. As a new lateral solidified region grows from the left to the right it will seed from lateral solidified region 104, continuing the crystalline structure of lateral solidified region 104 until meeting in the middle of the new melt region to form a new protrusion. The new protrusion will form at approximately position 314.

Figure 6:
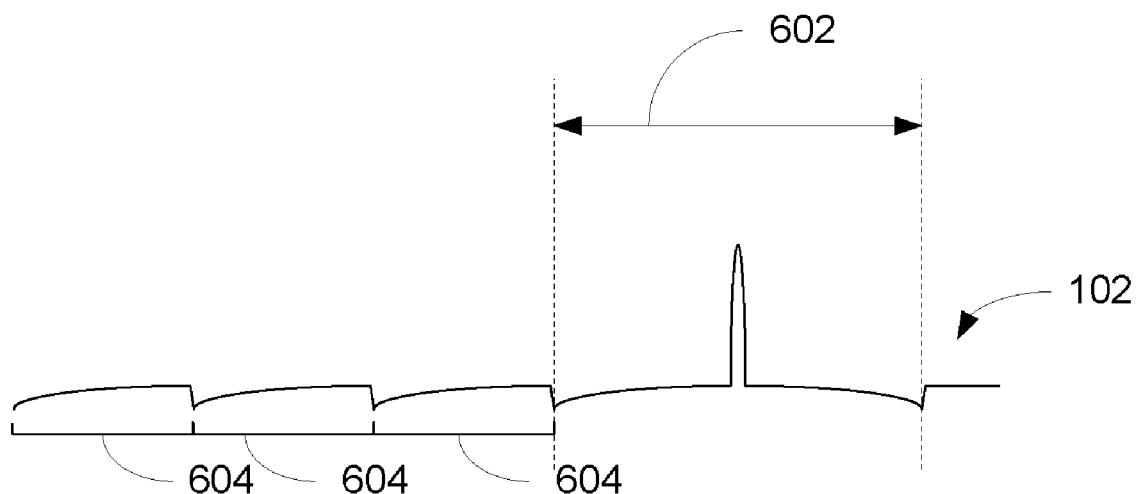
FIG. 6 is a diagram illustrating an example position of a beam after "n" pulses.

FIG. 6 is a diagram illustrating an example position 602 of a beam after "n" pulses. Film surface 102 can be moved at a constant rate. Each pulse can be timed to occur as film surface 102 moves one nominal step size 604. As can be seen, successive lateral solidification regions 604, each approximately half the length of beam width 602, are produced as the laser moves along the surface 102. As was discussed above, the nominal step size 604 is generally less than the theoretical maximum step size, and the actual step size can be maximized by having an intensity peak near protrusion 108.

Referring to FIG. 3, step distance 304 can be less than the theoretical maximum because it takes extra energy to re-melt protrusion 108 and light can be scattered by protrusion 108. Processing can only proceed as each section cools. Smaller steps can increase process time and waste time re-melting area that was melted before. Small portion 310 of lateral solidified region 104 is re-melted by photons 308 from the beam. As will be understood, the larger the small portion 310, the longer it will generally take to process film surface 102. Therefore, if small portion 310 can be minimized, i.e., a larger step size can be achieved, then this can generally speed up the manufacture process leading to faster processing time and larger production volumes.

Figure 5A:
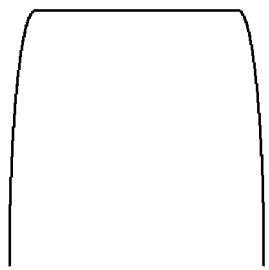
FIGS. 5A-5C are diagrams illustrating example short-axis spatial intensity profiles.
Figure 5B:
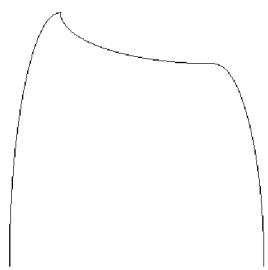
Figure 5C:
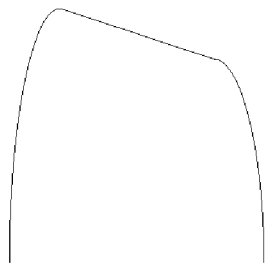

FIGS. 5A-5C are diagrams illustrating example short-axis spatial intensity profiles that can be used to direct more energy at the location of protrusion 108. FIG. 5A shows a top-hat profile. Generally, a top hat profile with steep sides, such as that illustrated in FIG. 5A, is preferable because it results in a more uniform application of energy to the surface 102; however as noted, it can be preferable to direct more energy at protrusion 108 in order to increase the step size. More energy can be directed at protrusion 108 by raising the energy density of a beam with a top hat profile such as that illustrated in FIG. 5A. But generally it is not sufficient to simply raise the energy density of the beam with a top-hat spatial profile, as this could ultimately lead to film damage or agglomeration at the side of the beam which is incident upon the amorphous-Si film.

Figure 8:
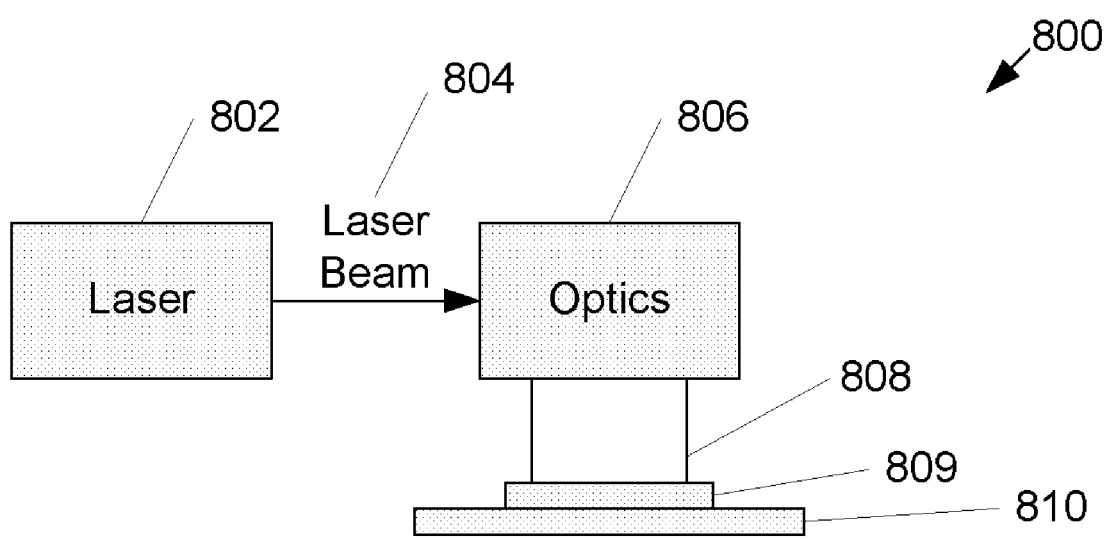
FIG. 8 is an example device for manufacturing a liquid crystal display.
Figure 9:
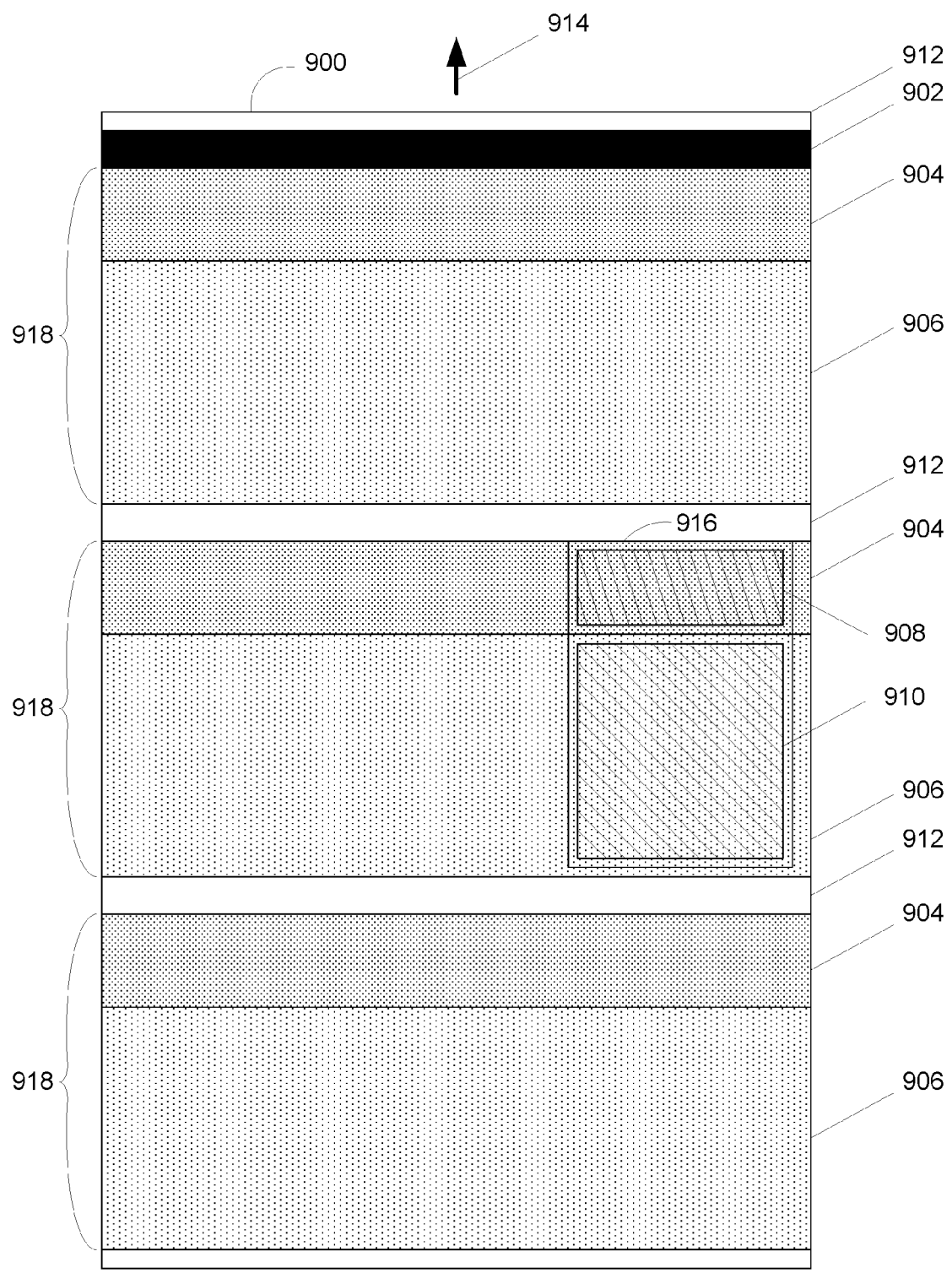
FIG. 9 is a diagram illustrating an amorphous silicon coated glass panel.

A laser beam short-axis profile that roughly correlates the intensity profile of the beam to the required melting temperature of the film is generally preferred. The profile can be tailored to enable the maximum per-pulse step distance without exceeding the damage threshold. FIGS. 5B and 5C illustrate two short-axis profiles with intensity peaks occurring on the edge of the beam that correlates with the location of protrusion 108. For example, proper control of the beam delivery and beam treatment systems as illustrated in FIGS. 8 and 9 of Co-pending U.S. patent application Ser. No. 10/884,547 entitled "Laser Thin Film Poly-Silicon Annealing System," filed Jul. 1, 2004, which is incorporated herein by reference as if set forth in full, can be used to manipulate the short-axis spatial intensity profile.

Figure 7:
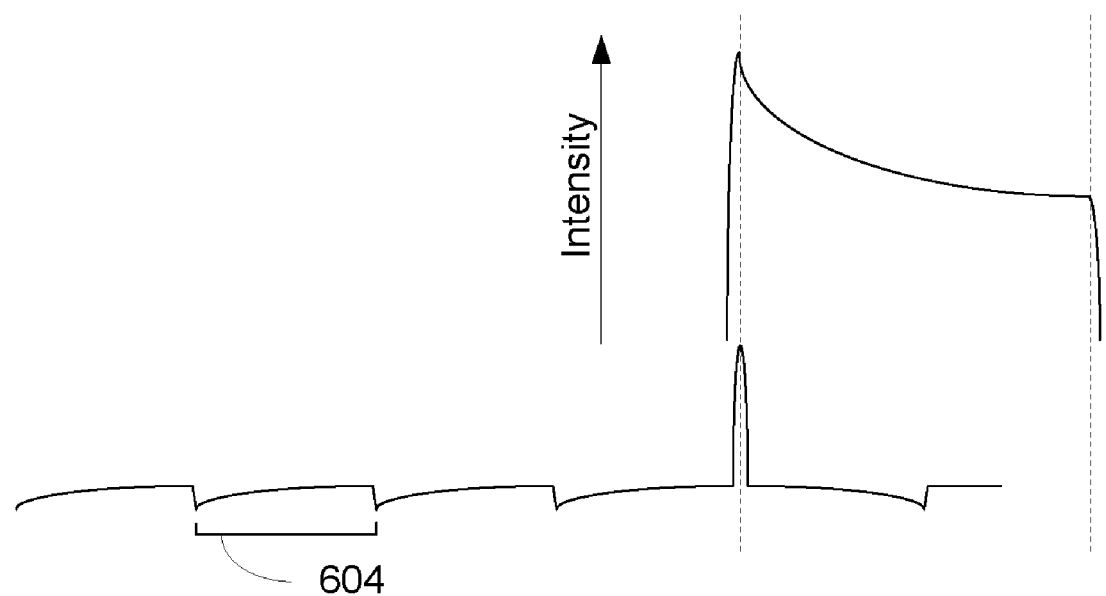
FIG. 7 is a diagram illustrating a beam spatial intensity and an example position of a beam after "n+1" pulses.

FIG. 7 is a diagram illustrating the use of a beam 712 with a short-axis, spatial intensity profile similar to that illustrated in FIG. 5b. As was discussed above, a short-axis laser beam profile that roughly correlates the intensity profile of the beam to the required melting temperature of the film is generally preferred. As can be seen in FIG. 7 the intensity is highest near protrusion 108. In this way more energy can be supplied to provide the additional energy that can be required to melt protrusion 108 due to increased thickness and scattering, as discussed above. Because more energy is contained in the left hand side of the short-axis profile, the step size 704 can be increased, such that it more closely approaches the theoretical maximum, but still ensures adequate melting of protrusion 108.

In other words, by using a short axis, spatial intensity profile, such as illustrated in FIGS. 5B and 5C, portion 310 can be reduced and the step size can be increased. It will be understood that the increase in size will depend on the implementation, but that the step size can be nearer to the theoretical maximum due to the increased intensity of the beam at the location of protrusion 108. The step size can, for example, be increased up to several hundred nanometers for a sum beam width.

FIG. 8 is an example surface treatment system 800 for manufacturing a liquid crystal display in accordance with one embodiment of the systems and methods described herein. Thin-beam Directional Crystallization as described above, combines the benefits of lateral crystal growth with higher throughput, improved poly-Silicon uniformity and tailoring the short-axis spatial intensity profile to the energy required to the melt silicon film.

Using a specially designed laser 802 and custom beam forming optics 804, substrate 809 can be exposed with a long thin beam 808. A beam forming optical system 804 can produce a short-axis spatial laser beam profile, e.g., as discussed above with respect to FIGS. 5A and 5B. In one embodiment long thin beam 808 can measure 5 microns wide by up to 730 mm long. This beam configuration can allow for complete coverage across the width of a glass substrate 809 during a single laser pulse. Because a 5 microns wide region is rendered completely molten, the Silicon solidifies by lateral growth crystallization, resulting in high mobility poly-Si. To process the entire substrate 809, the glass can be scanned beneath the beam 808 so that the crystallization occurs in a single pass. The glass can move at a constant velocity, and the laser can be triggered to fire after a translation of approximately 2 μm. By overlapping each new "stripe" over the previous one, a new stripe can be "seeded" from good poly-Si of the previous stripe, and the system can achieve continuous growth of a long, uniform crystal grains across the entire substrate 809.

The practical realization of the Thin-beam Directional Crystallization can include, for example, three major components in the system: the laser 802, the beam forming optics 804 and the stage 810. In one embodiment a specially designed high power laser 802 with a carefully chosen combination of power, pulse frequency and pulse energy to support the long beam and high scan rates can be used. This laser 802 can, for example, provide 900 W of power, which is almost three times the currently available laser power, to ensure the highest throughput. In one embodiment a laser 802 originally designed for the demanding semiconductor lithography application can be used to ensure good uniformity of the poly-Si and the TFT performance throughout the substrate.

In one embodiment stage 810 can be moved under long thin beam 808 using a stepper or translator. In this way the portion of panel 809 that is under beam 808 can be controlled so that various parts of panel 809 can be processed. In one embodiment, panel 809 can be an amorphous silicon coated glass panel. Thus, beam 808 can be used to melt a silicon film surface on panel 809.

An optical system was developed to create the optimal beam shape. In one embodiment the optimal beam shape can be long enough to cover the entire width of a substrate and narrow enough to optimize the crystallization process. Particular care can be taken with the design of the projection optics contained in the optical system to ensure thermal stability and controlled Depth of Focus (DOF) under high power loads, and to maximize the optics lifetime.

In one embodiment, to ensure rapid motion in the scan direction, the laser must operate at a high repetition rate, for example, at 6 kHz, and the stage speed can, e.g., be 12 mm/sec for an approximately 2 micron pitch. The substrate can be exposed in a single pass, which requires approximately a 200 mJ/pulse to expose a Gen4 substrate. In one embodiment a thin beam crystallization system with a 6 kHz, 900 W laser can process an entire Gen4 panel in as little as 75 seconds.

A more detailed explanation of example embodiments of a surface treatment system 800 that can be used in accordance with the systems and methods described herein are described in U.S. application Ser. Nos. 10/781,251; 10/884,101; 10/884,547; and 11/201,877.

FIG. 9 is a diagram illustrating an amorphous silicon coated glass panel 900. Panel 900 can be processed using the systems and methods described herein, to form circuit areas 904 and display areas 906, which can be used to form a plurality of single displays, such as display 916. Each display region 918 can be separated by an untreated, amorphous silicon region 912. The circuit and display areas, 904 and 906 respectively, can be formed by passing a laser beam 902 over panel 900 in the direction of arrow 914. After panel 900 is processed to form circuit areas 904 and display areas 906 different types of circuits, e.g., transistors, pixel addressing transistors, i.e., TFTs, digital circuits, etc. can be formed on the silicon substrate.

The placement of circuit area 904 and display area 906 can, for example, be based on a predetermined layout or mapping of panel 900. This layout or mapping can be pre-loaded or continuously fed to a controller such that step distances between laser pulses can be varied on a shot by shot basis. One or more panels 900 can then be processed using the predetermined layout of panel 900. For example, the panel can be processed using the TDX process described above.

Circuit area 904 and display area 906 can be used for different purposes, e.g., forming digital circuits in circuit area 908 and forming pixel addressing transistors in display area 910. Digital circuits and pixel addressing transistors can each have different requirements. For example, the display area can require a high degree of uniformity for the pixel addressing TFTs, otherwise visual artifacts, generally referred to as "mura" can result in the display. This can be especially true for displays using OLEDs.

Implementations of laser based annealing methods such as ELA, SLS and TDX can result in mura. The source of mura can vary depending on the technique used to make the display area 910. For example, for an ELA process the mura observed can be called shot mura. Shot mura can form when the laser energy varies from shot to shot, and particularly when the step size is approximately the same size as the transistor channel that will ultimately be deposited on the silicon film. ELA can use a 400 μm wide beam with a step size of 10-20 μm. The transistor channel dimensions are generally also on the order of 10-20 μm. Variations in the energy from one laser shot to next can cause variation in the material uniformity.

Digital circuit area 908 is generally not going to be seen and therefore, visual artifacts such as shot mura are generally not important. Performance can, however, be important in digital circuit area 908 because, for example, high performance can lead to higher speed digital circuits.

As a result of the different requirements, it can be desirable to use different processing techniques on different areas of panel 900. For example, a process that produces greater uniformity can be used in display area 906, while a process that produces higher quality can be used in circuit areas 904. In one embodiment, for example, a more traditional ELA type process can be used for display areas 906, while the TDX process described above is used in circuit area 904. Further, by using the same tool, e.g., system 800, as used for the TDX process described above, a much smaller beam width can be used for the ELA process, e.g., 20 μm vs. 400 μm. A smaller step size, e.g., 1 μm, can also be used, resulting in more shots per area as compared to that achieved with conventional ELA tools. This will provide more averaging across each transistor in display area 906 and the reduction of the ELA shot mura that conventional tools produce. Further, since the same tool can also perform the TDX process, high performance circuit areas 904 can be produced on the same substrate in one pass of beam 902.

Accordingly tool 800 can be configured to perform ELA in a low energy mode, where the Si film is not completely melted during exposure, in contrast to the normal mode described above where each pulse fully melts the Si film. If the optimal energy density and step size combination are chosen, the resulting material can be small-grained uniform poly-silicon. It should also be noted that it can be preferable to tailor the average grain size to be many times smaller than the transistor channel dimensions to fit a large number of grains within the active device area and induce a large amount of averaging.

Thus, the energy density of incident beam 902 on substrate 900 can be switched to the energy normally used in TDX processing when the beam falls on regions where it is desirable to have high-quality directionally-solidified poly-Si, e.g., in regions 904, and reduced to a level below the energy needed for complete melting of the film when scanning regions used for pixel addressing, e.g., regions 906. In this manner, displays 916 can be produced by combining different modes of operation, i.e., a low energy mode and a high energy mode.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:
1. A device for processing a substrate comprising:
a laser configured to produce laser light, the laser configured to have a high energy mode and a low energy mode, the high energy mode configured to produce light energy sufficient to completely melt a silicon film, and the low energy mode configured to produce light energy that is not sufficient to completely melt a silicon film;
beam shaping optics coupled to the laser and configured to convert the laser light emitted from the laser into a long thin beam with a short axis and a long axis;
a stage configured to support the substrate and film; and
a translator coupled with the stage, the translator configured to advance the substrate and film so as to produce a step size in conjunction with the firing of the laser, wherein the translator and the firing of the laser are configured to produce a smaller step size in the low energy mode when compared to the step size of the high energy mode.

2. The device of claim 1, wherein the low energy mode is used to process a display area.

3. The device of claim 1, wherein the high energy mode is used to process a circuit area.

4. The device of claim 1, wherein the beam width in the short axis when the low energy mode is used is approximately 20 μm.

5. The device of claim 1, wherein the step size when the low energy mode is used is approximately 1 μm.

6. The device of claim 1, wherein the step size when in the low energy mode is configured such that approximately 10 shots of the laser occur across the width of an electronic device that can be formed on the substrate.

7. The device of claim 1, wherein the step size in high energy mode is configured to be near a theoretical maximum step size.

8. The device of claim 1, wherein the high energy mode produces approximately 750 mJ/cm$^2$ at the surface of the substrate.

9. The device of claim 1, wherein the low energy mode produces approximately 250 mJ/cm$^2$ at the surface of the substrate.

10. The device of claim 1, wherein the step size when the high energy mode is used is approximately 5 μm.

11. The device of claim 1, wherein the step size when the high energy mode is used is approximately 2.0 μm.

12. The device of claim 1, wherein the device is configured to process a glass panel coated with amorphous silicon.

* * * * *